3,472,273
LIQUID LEVEL CONTROL DEVICE
Reginald H. B. Perry, Wallington, Surrey, England, assignor to Gardiner, Sons & Company Limited, Broad Plain, Bristol, England, a company of Great Britain and Northern Ireland
Filed May 6, 1966, Ser. No. 548,119
Int. Cl. F16k *31/22;* F01m *11/06*
U.S. Cl. 137—389     5 Claims

ABSTRACT OF THE DISCLOSURE

The invention provides a liquid level control device which has a float controlled sleeve valve seating on a hollow stem which passes axially through the device, the other end of the hollow stem providing a seating for a shut-off valve controlled independently from the float valve for the purpose of preventing liquid flow to the float valve at specific times. The device is primarily for coupling to an engine with a forced oil lubricating system in which case the second valve is a piston valve acted on by the oil of the lubricating system so as to prevent inlet of the liquid into the device at the time when the engine is running. The float chamber has a free outlet for coupling to the sump or other container of which the liquid level is to be controlled.

---

This invention relates to liquid level control devices and particularly to devices useful for topping-up oil in an engine which has an oil sump in which oil has to be kept to a predetermined level.

Devices have been proposed to overcome the problems which are met particularly when these devices are to be mounted on a vibrating base such as an engine. Two things are of importance. One problem is the provision of a controllable duct for oil from a supply to the oil sump, controlled by a smooth acting valve and without restriction of the passage through which oil has to flow. This is necessary for adequate flow of the oil, which flow is only available for limited periods, because the second requirement for this construction (a requirement enforced by law in many countries) is that if the device is mounted to an engine, it must not be capable of supplying oil to the engine during the time the engine is running. In the case of continually operating and hard used vehicles such as buses there may be a considerable consumption of oil and only a limited period available for its replacement through the device. The second problem, therefore is the provision of further valve means in the device for cutting off that flow.

It is an object of the invention to provide a liquid level control device which acts in a mechanically efficient manner to achieve the results required.

It is a further object of the invention to provide a liquid level control device which, in association with a container of liquid of which the level is to be controlled, will control that level in an efficient and regulable manner. In the case that the container is the sump of an engine, the device is operatively linked to the engine by means responsive to the condition of the engine so that oil flow is prevented when the engine is running.

It is a further object of the invention to provide a device which may be embodied with a liquid supply duct constant in cross section throughout its length, including all ports or other apertures through which liquid has to pass. The device according to the invention is particularly suitable for liquids with viscosity greater than that of water.

In the case that the device is to be used with a vibrating object such as an engine, it is preferred to provide means for maintaining the fluid level control portion of the device with means to resist vibrational shocks and hold its valve in a fully open or fully closed position.

Figure 1:
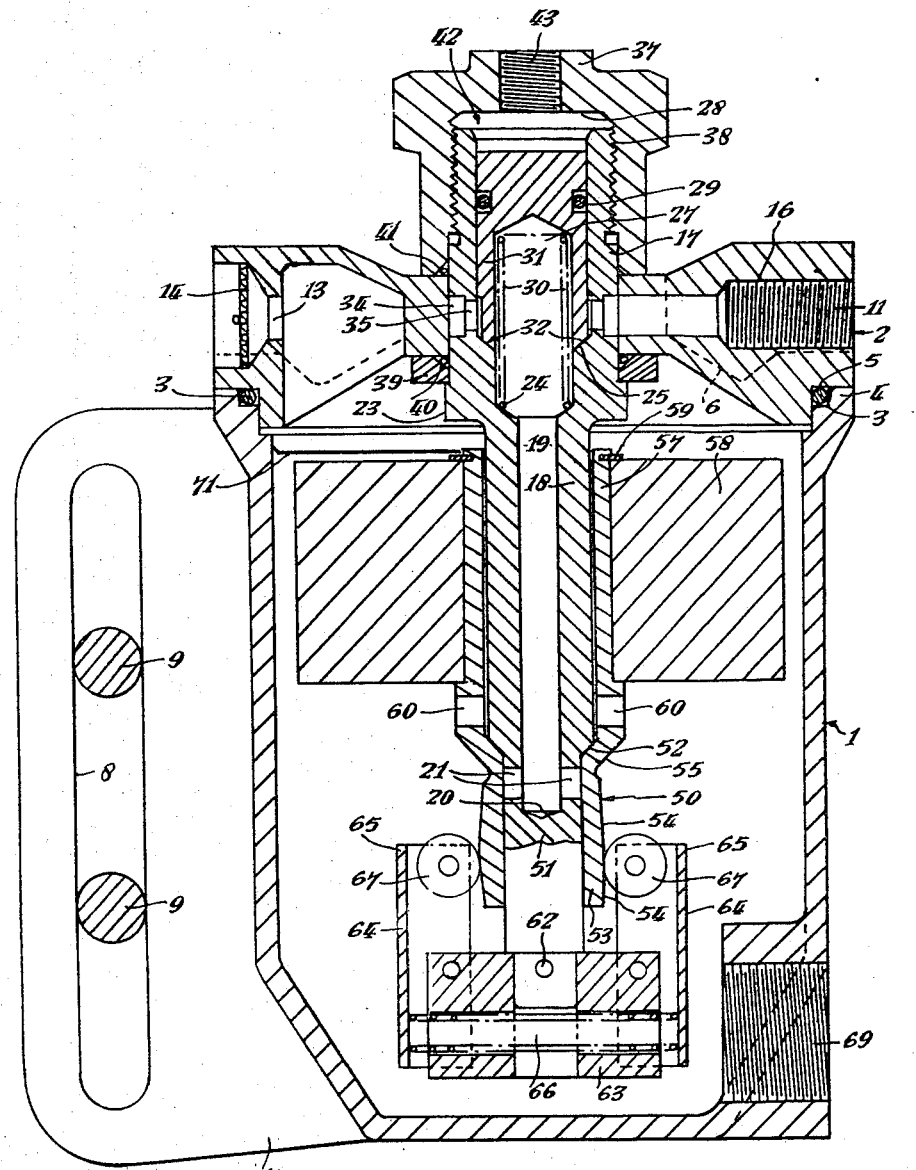
Figure 2:
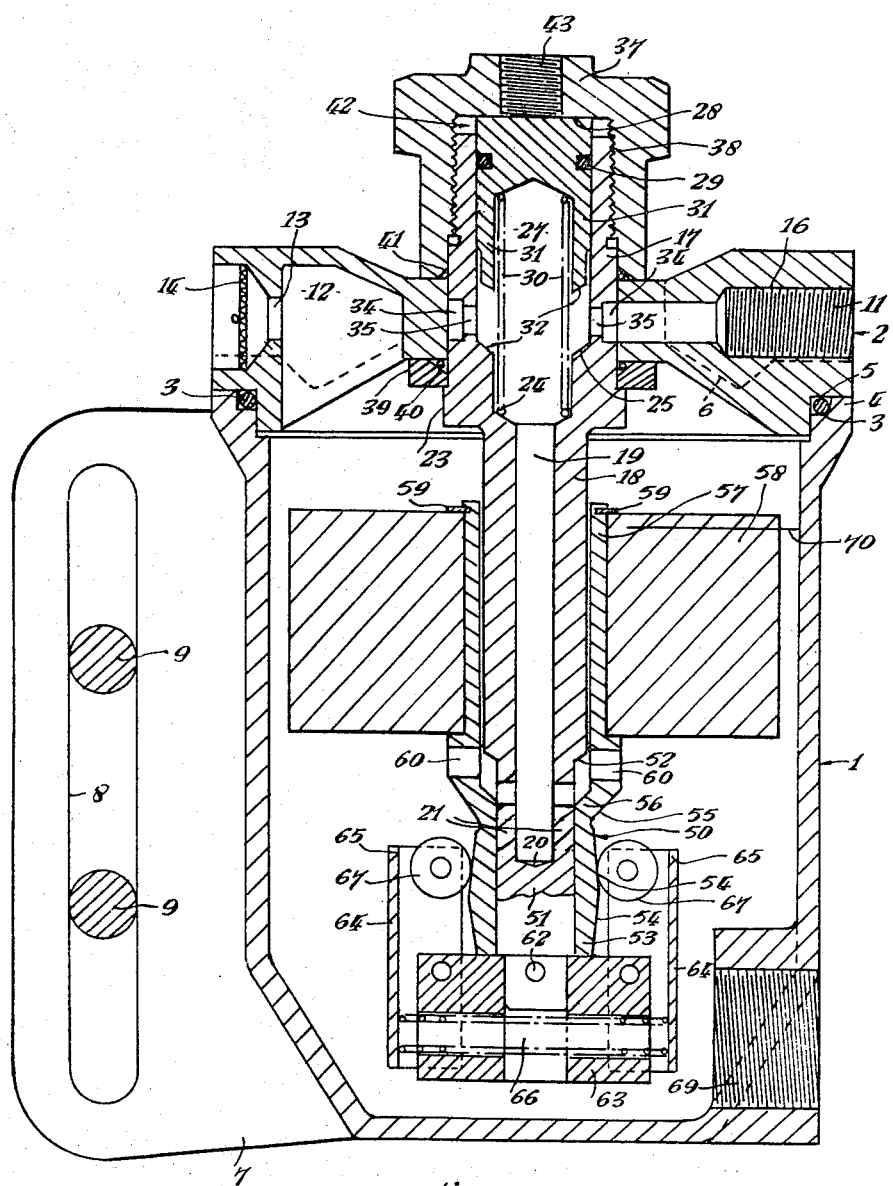

Other objects and advantages of the invention will become apparent from the following description of one embodiment of the invention, as a liquid level control device for the oil sump of a motor vehicle, which will now be described with reference to the accompanying drawings wherein:

FIGURE 1 is a diametrical section through a device embodying the invention, with its valves in closed condition, and FIGURE 2 is a diametrical section of the device showing the valves in open condition.

The device comprises a cylindrical body 1 and a cap 2 which are sealed fluid-tight together by means of a sealing ring 3 interposed between the cap 2 and an annular recess 5 in the body 1. The body is provided with a bracket flange 7 with a slot 8 extending in it parallel to the axis of the cylinder of the body 1. Attachment of the device by means of bolts 9 to a bracket on the engine or body chassis of the vehicle can be adjusted as to level by movement of the bolts 9 in the slot 8.

The cap 2 is generally of an upwardly dished shape (see dotted lines 6) but at one diameter there is provided a radial oil inlet duct 11 on one side of the cap and a chamber 12 with a breathing port 13 at the other side of the cap. The breathing port 13 is provided with a gauze filter 14 to prevent the entry of dirt. The radial inlet duct 11 is formed within the thickness of a boss extending out of the dished portion 6 of the cap 2 and is not in direct communication with the interior of the body 1 which forms a chamber for liquid. A threaded surface 16 is provided in the inlet duct 11 for engagement to a lubricant feed pipe.

In an aperture at the centre of the cap 2 is mounted the upper part 17 of a bored column 18, so that the main length of the column 18 projects inwardly into the volume within the body 1 and nearly to the bottom of that body. The bore 19 of the column does not extend completely to the bottom of the column but about two thirds of the way down its length terminates as at 20. Near the termination 20 radial ports 21 are provided to communicate between the bore and the outside of the column. The ports 21 are of approximately the same area as the bore 19 of the column; the bore 19 has a diameter of a quarter of an inch in this example. An annular shoulder 23 projects round the column between its lower portion 18 and upper portion 17, and the upper portion 17 is of greater diameter than the lower portion 18.

Within the upper portion 17 the bore 19 of the column is successively widened first at 24 within the shoulder 23 and then again to provide a conical annular surface 25. Within the cylindrical and widest portion of the bore 19, forming a valve chamber 27, and above the annular surface 25 a piston valve 28 makes a sliding fit with the cylindrical walls of the chamber and makes a fluid-tight seal with them by means of a sealing ring 29. The head of the piston valve 28 is uppermost and its cylindrical skirt 31 depends and has a bevel edge 32 to seat on the annular surface 25. The piston valve 28 is spring loaded upwardly in the chamber 27 by means of a spring 30, bearing against the annular surface at 24 and supported within the skirt 31 of the valve 28.

A continuous annular recess 34 is formed in the outer wall of the upper portion 17 of the column 18 and a plurality of radial ports 35 lead from it to the chamber 27, above the conical surface 25. The column 18 and piston valve 28 are assembled to the cap 2 by means of a faceted sleeve nut 37 which engages a screw thread 38 provided at the uppermost outer wall of the upper portion 17 of the column 18. When the sleeve nut is tightened the shoulder 23 of the column is pulled up against a collar 39 and a sealing ring 40 on the under surface of the cap 2 and the lower end of the sleeve nut 37 presses, sealed by sealing ring 41, against the upper surface of that cap to make a secure and fluid-tight assembly. In this position, the annular recess 34 is brought into register with the innermost end of the inner port 11 for fluid communication between them and the associated radial ports 35. A chamber 42 is formed above the head of the piston valve 28 and between it and a threaded inlet port 43 in the sleeve nut 37.

A valve sleeve 50 tightly but slidably engages the lowest part 51 of the column 18 generally below the level of the ports 21. The lowest portion 51 of the column is of lesser diameter than the middle portion 18 and is joined to that portion by a widening having an exterior conical annular surface 52. The portion 51 and the valve sleeve 50 form a sleeve valve by virtue of the ports 21, 60 in them and the seatings on them.

The valve sleeve 50 comprises two cylindrical portions, the lower, 53, which tightly slidably engages the part 51 of the column, having two outer conical faces 54 at an angle to one another such that there is a thickening half way along the length of the portion 53. A conical portion 55 having a conical annular inner surface 56 adapted to seat against the surface 52 joins the portion 53 to an upper portion 57 which is a loose fit about the middle portion of the column 18. A float 58 is attached about the sleeve portion 57 and retained by a circlip 59. The float may be of cork, plastic or any suitable light material, or of hollow metal. Radial ports 60 in the upper portion of the sleeve valve 57 above the surface 56 but below the float 58 are of the same diameter as the radial ports 21, and are arranged so that when the float 58 and valve sleeve 50 sink down the column the ports 21 and 60 are brought into communication, liquid passing between the surfaces 52 and 56, and the path of the fluid is always through passages which are substantially the same area as the bore 19 of the column 18.

At the lowermost end of the lower portion 51 of the column there is pivotally secured by a bolt 62, a transverse member 63 which supports, beyond each end of the diameter of the lowest part 53 of the sleeve 50, two pifotally attached lever members 64, and these lever members 64 are spring loaded by a sprng 66 to be present together at ther upper ends 65. A roller 67 mounted towards the inner edge of the upper end 65 of each of the members 64 is therefore pressed against a conical surface 54 on the lowest portion 53 of the valve sleeve.

At the lowermost part of the body 1 and diametrically opposite to the flange 7 a wide, threaded, outlet duct 69 is provided, to communicate with the sump of the engine of the vehicle to which the device is fitted.

To assemble the valve the cap, column and piston valve assembly is first made as described, then the sleeve valve placed on the column and the spring loading member 63 and its associated members attached to the bottom of the column. The cap 2 is then screwed down to the body 1 by nuts and bolts passing through bosses (not shown) in the shoulder 4 and the edge of the cap 2 to form a fluid-tight seal together.

Although FIGURE 2 shows the piston valve 28 and the valve sleeve in an open position, and FIGURE 1 shows these valves in the closed position, the operation of these valves is independent one of the other.

To operate the topping-up device, the inlet 11 is connected to a lubricant supply pipe, the outlet 69 to the sump of the engine of the vehicle and the inlet 43 to the lubricant pressure line of the vehicle.

When the engine is not running, the piston valve 28 is spring loaded upwardly towards the sleeve nut 37 and the bevel edge 32 is lifted clear of surface 25 to permit passage of lubricant from the inlet 11 through the recess 34, ports 35 through the chamber 27 down the bore 19 to the ports 21. If the lubricant in the chamber within the body 1 has dropped to the level 70, or lower, the valve sleeve 50 will have fallen to the position shown in FIGURE 2 and lubricant can pass through the ports 21, between the surfaces 52 and 56, through the ports 60 into the chamber in the body 1. From the chamber the lubricant can pass into the engine sump through the outlet duct 69 and the flow of lubricant in this way will continue until the level of the lubricant both in the engine sump and in the chamber rises to 71. When the level of the lubricant is at 71 the buoyancy of the float 58 will overcome the spring loaded pressure of rollers 67 against the upper of the conical surfaces 54 and the sleeve valve moves upwards. Once the maximum thickness of the portion 53 of the sleeve 50 has moved past the roller 67, this roller will engage the lower of the conical surfaces 54 and thus assist the upward movement of the sleeve valve, which will continue until the surfaces 56 and 52 seat together and the ports 60 are shut off from communication with the ports 21, thus stopping any flow of lubricant.

The spring loaded pressure of the roller 67 against the lower of the conical surfaces 54 will hold the surfaces 56 and 52 together, thus preventing the dribble of lubricant between them which would otherwise occur due to shock or vibration intermittently displacing the sleeve valve, or to the float taking up a position intermediate between the upper and lower lubricant levels 70 and 71.

The sliding fit between the lowest part of the column 51 and the lowest part of the sleeve valve 53, and the length of the leakage path between them, will be such that any leakage of lubricant downwards between them will be negligible, bearing in mind the application of the device.

If the engine of the vehicle is running, however, lubricant pressure from the engine is applied through the inlet 43 and the chamber 42 to the head of the piston valve 28 and this is forced down against its spring 30 until its surface 32 at the bottom of its sleeve 31 bears against the corresponding surface 25, and lubricant is prevented from entering the bore 19 from the inlet 11. When the engine is next stopped or in the event of loss of lubricant pressure the piston valve 28 rises and, if sufficient oil has been used during the running of the engine, the sleeve 50 will fall and lubricant will be fed in until the correct oil level is again reached in the engine.

This arrangement whereby the topping up of the engine sump is automatically prevented when the engine is running is desirable for this application and is so specified by vehicle operators.

The communication between the sump of the vehicle and the chamber within the body 1 is permanent by means of the wide duct 69. The level of oil maintained within the vehicle sump is, of course, governed by the adjustment of the level of the device about its fixing slot 8. Breathing occurs by means of the port 13, which can also serve as an overflow port in case of failure.

The device may be applied to the maintenance of optimum level of lubricating oil in the sump of a diesel or petrol engine, particularly in a bus, coach, truck or other large commercial vehicle.

The device is also suitable for many other applications, such as the following:

(a) For the lubricating oil systems in engine installations of all types, e.g. stationary and marine applications.

(b) For any machine in which the lubricating oil system includes an oil reservoir, e.g. steam turbines, rolling mills.

(c) For the maintenance of the level of oil fuel in the service tanks of oil fired boiler plant or furnaces.

(d) For any process plant or other plant in which a viscous fluid (preferably of a viscosity greater than that of water) must be maintained in a container, tank, reservoir, etc., to a predetermined level.

The shut-off valve (the piston valve 28) may be operated by means other than the lubricant pressure line of the vehicle engine, for instance, by independently controlled hydraulic pressure or by compressed air or manually or electrically, and ge arranged to operate normally open or normally closed by suitable spring loading.

The dimensions of the device will be chosen to suit the required rate of top-up and/or the size of pipe connections required which in turn will usually be governed by the viscosity of the liquid with which the device is to operate. The material from which the device is constructed will be chosen to suit the nature of the liquid with which it is to operate, as also will be the size of the float, whose buoyancy will need to be varied with various liquids.

The spring loaded cam means which hold the float valve in either the open or the closing position may be replaced by other suitable means, or may be omitted altogether. Although we find it operationally preferable to apply such means to the device, this represents quite an appreciable increase in cost, and for many purposes (including some applications to vibrating bases such as engines) it is found quite satisfactory to omit the double conical portion of the sleeve 50 as well as the rollers 67 and their mounting, terminating the sleeve 50 at its lower end in a short cylindrical portion sliding over a shortened end part 51 of the column 18.

It can be seen that in the present embodiment the action of spring loaded cam means against the sleeve valve makes that valve insensitive to vibration and shock, and also that passage for liquid through the valve is always by means of wide ports and passages of substantially the same total liquid-passing cross-sectional area throughout.

The device is particularly intended for use with liquids with the viscosity of water or greater.

What I claim and desire to secure by Letters Patent is:

1. A liquid level control device having a body and a central straight hollow column, a liquid inlet into the hollow column at one end portion thereof and an outlet at the other end portion thereof, the hollow column acting as a liquid duct, a first valve member movable axially of the column and seatable against a valve seating on the column to control flow of liquid through the inlet, a second valve member being a valve sleeve surrounding the column and slidable axially of the column and seatable against a valve seating on the column to control flow of liquid through the outlet, an annular float surrounding the column, the float being fast with the second valve member and housed in a float chamber in the body to control the position of the second valve member in accordance with liquid level in the float chamber, means independent of the second valve member controlling the position of the first valve member, and a free outlet from the float chamber for liquid of which the level is controlled by the device.

2. The combination is defined in claim 1, wherein the first valve of the liquid level control device has an open limit position and a closed limit position, the device having addtionally means postively urgng the first valve towards either one of the two said positions, according to the position of the float, away from an intermediate position between them.

3. A liquid level control device according to claim 1 wherein the first valve member is a piston housed within the hollow column, and adapted to be moved by liquid pressure acting on the head of the said piston.

4. A liquid level control device according to claim 1 wherein there is a plurality of ports forming the said inlet and outlet of the hollow column, the total cross-sectional area of te inlet ports being substantially equal to the total cross-sectional area of the outlet ports and the cross-sectional area of the duct.

5. A liquid level control device according to claim 3 wherein the seatings on the column for the first and second valve members are conical seatings, that for the first valve member being within the hollow column, that for the second being external of the hollow column.

References Cited
UNITED STATES PATENTS

| 2,722,286 | 11/1955 | Lyttle. | |
| 2,888,030 | 5/1959 | McQueen | 137—411 X |
| 3,229,712 | 1/1966 | Perkins | 137—428 X |
| 3,335,736 | 8/1967 | Liebel et al. | |

HOUSTON S. BELL, JR., Primary Examiner

U.S. Cl. X.R.

123—196; 137—411, 430; 184—103